United States Patent [19]

Sasnett et al.

[11] Patent Number: 4,500,996
[45] Date of Patent: Feb. 19, 1985

[54] HIGH POWER FUNDAMENTAL MODE LASER

[75] Inventors: Michael W. Sasnett, Los Altos; James L. Hobart, Los Altos Hills; Larry A. Gibson, Redwood City, all of Calif.

[73] Assignee: Coherent, Inc., Palo Alto, Calif.

[21] Appl. No.: 363,843

[22] Filed: Mar. 31, 1982

[51] Int. Cl.³ .............................................. H01S 3/03
[52] U.S. Cl. ...................................... 372/19; 372/61; 372/93; 372/103
[58] Field of Search ....................... 372/19, 61, 93, 103

[56] References Cited

U.S. PATENT DOCUMENTS 3,699,471 10/1972 Mulready et al. .................. 372/103

FOREIGN PATENT DOCUMENTS 101299 8/1979 Japan ..................................... 372/61
124289 9/1980 Japan ..................................... 372/19

OTHER PUBLICATIONS

Sasnett et al., "10.6 Micron Laser Frequency Control Techniques", *Technical Report AFAL-TR68-210*, Sep. 1968, pp. 27-32.

*Primary Examiner*—James W. Davie
*Attorney, Agent, or Firm*—J. William Wigert, Jr.

[57] ABSTRACT

A high power, fundamental (TEMoo) mode gaseous laser is described having a discharge-confining bore tube which is provided with spaced-apart annular, inwardly-extending, radial projections or rings, which have inside diameters which match the fundamental mode diameter along the tube.

11 Claims, 7 Drawing Figures

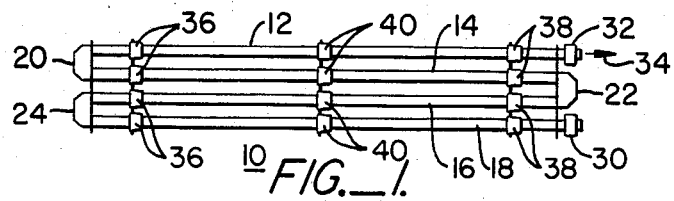
FIG._1.
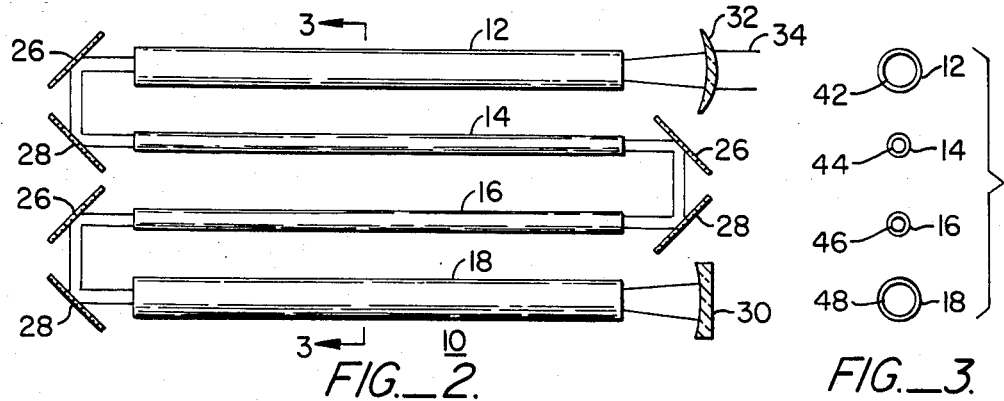
FIG._2. FIG._3.
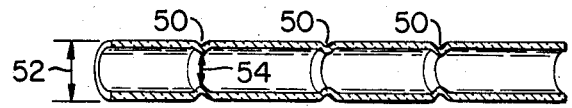
FIG._4.
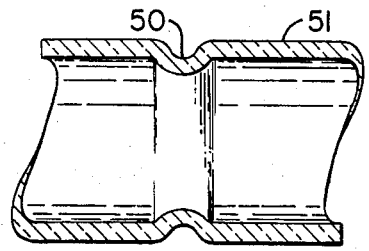
FIG._5.
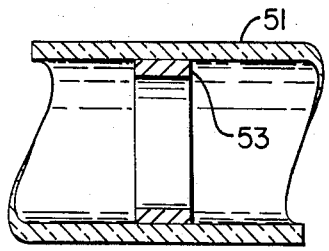
FIG._6.
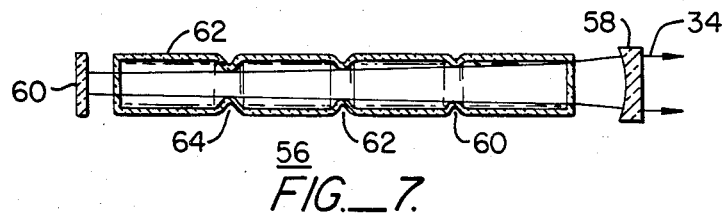
FIG._7.

HIGH POWER FUNDAMENTAL MODE LASER

BACKGROUND OF THE INVENTION

The first gas laser ever built and demonstrated, the helium-neon laser, made use of a relatively long glass tube to contain the sub-atmospheric pressure mixture of gases that made up the active medium, and to confine the electric discharge that excited the gas mix. This design approach was used as well in the early development of the carbon dioxide ($CO_2$) laser. In the first $CO_2$ laser, built by C. K. N. Patel in 1964, the electric discharge was in a glass tube off to the side of the main tube. This discharge excited nitrogen that was then mixed with $CO_2$ in the main tube. It was soon realized that the more simple configuration employing an electric discharge through a homogeneous mixture of the gases in the main glass tube gave the best performance. Advantages for the glass tube approach include:

1. The inherent simplicity and economy that comes from maintaining a coaxial arrangement of the optical, gas flow, and electric current axes. The gas and the electric discharge are thus confined to the same volume—always desirable for maximum efficiency.

2. Easy availability of glass tubing in a wide range of sizes, and easy fabrication of one-piece structures that typically includes co-axial liquid cooling jackets and various connection ports.

3. Design geometry that provides favorable conditions for generation of an output beam with circular symmetry. With this approach all fluid, heat, and electric current flow is basically symmetrical with respect to the optical axis.

Other design concepts arrange the optical, gas flow and excitation axes so they are not all coaxial. Typically one, two or all of the axes are at right angles to each other and glass tubing is not necessarily a significant part of the structure. These designs allow more rapid convective heat transfer out of the active region and for this reason can produce higher output powers with shorter active lengths, but they are more costly to make and typically exhibit output modes that are not circularly symmetric and are of poor quality. For these reasons the conventional coaxial glass tube design approach remains an important one, especially for $CO_2$ lasers with continuous output powers of less than 1000 watts.

Even with all of the favorable symmetry conditions and despite the best efforts of laser engineers, the goal of achieving a fundamental mode or gaussian ($TEM_{oo}$) power distribution across the output beam from $CO_2$ lasers at power levels over 200 watts has remainded an elusive one. The design process proceeds generally as follows:

1 An active length that will provide the desired power output is chosen. Seventy-five (75) watts/meter remains a good figure to use in calculating the active length needed.

2. The radii of curvature for the end mirrors is selected so that the optical cavity is stable, i.e., light rays travelling near and nearly parallel to the cavity axis remains in the cavity after an arbitrarily large number of reflections from the end mirrors. Also, the mirror curvatures are selected to make the mode sizes at the mirrors as nearly equal as possible.

3. With the cavity length (active length plus any extra space needed between the mirrors) and the mirror radii known, computer-generated data is consulted and the limiting aperture for the cavity that allows the $TEM_{oo}$ mode to oscillate with as little loss as possible is selected but still provides enough loss to prevent the $TEM_{01}$ and higher order modes from oscillating. One such source is H. Vogelnik and Ti Li, Proc. IEEE, Vol. 54, p. 1312–1329, October 1966. At its best this diameter selection process is not an exact science, and it is most successfully done from the perspective of experience.

For lasers of less than 20 watts output this method works fairly well. For lasers less than 100 watts it works less successfully, and for lasers over 100 watts it doesn't work at all. Lasers designed in the foregoing manner put out all the power expected but not with a $TEM_{oo}$ mode. If a smaller bore diameter is used, the laser still puts out the same poor mode. Several such iterations will finally yield a laser with a much smaller bore diameter that puts out less power than expected and a mode that is still far from perfect. The theoretical optical loss for this laser would show that not even the fundamental $TEM_{oo}$ mode should lase, let alone any of the higher order modes that are evident in the output.

It has been concluded that the plasma tube must be confining and guiding the beam with very little loss, e.g., acting as a waveguide to conduct the beam back and forth between the mirrors. It is well known that light can propagate in waveguide structures made up of either metal or dielectric materials. What has not been obvious is that the losses for waveguide modes are low enough to permit laser oscillation in $CO_2$ lasers at 10.6 micrometers in glass (pyrex) tubes.

It was recognized that the inner surface of plasma tubes could be reflective for $CO_2$ laser beams and that this could have a detrimental effect on mode quality. See "10.6 Micron Laser Frequency Control Techniques", by Sasnett et. al., Sylvania Electronics Systems Western Division, Technical Report AFAL-TR-68-210, September, 1968. It was found that by providing periodic changes in tube diameter any reflections are broken up and scattered. This was particularly important in lasers that used dispersive intracavity wavelength selective elements such as a grating or prism. These elements were intended to deflect unwanted wavelengths out of the cavity so oscillation would occur only on the desired wavelength, and it was important that the tube wall did not reflect the unwanted energy in such a way that it could oscillate. Such wavelength selection techniques are only important in lasers of less than about 100 watts.

When a high power $CO_2$ laser was built, using the aforesaid techniques for calculating the tube diameter, and rings were inserted within the bore tube to break-up and scatter any light that would otherwise have been reflected from the tube walls, the results were disappointing.

SUMMARY OF THE INVENTION

It is therefore an object of the invention to provide a high-power gaseous laser with improved fundamental mode operation.

Another object of the invention is to provide an improved carbon dioxide laser, which is both powerful and provides satisfactory $TEM_{oo}$ mode outputs.

In accordance with the present invention a gaseous, laser, such as a carbon dioxide laser, is provided with a discharge-confining bore tube having inwardly projecting, spaced-apart, annular projections or rings for dispersing unwanted reflected light within the bore tube.

The bore tube and its associated annular projections has a diameter chosen to match the size of the fundamental mode along the bore tube. This can be accomplished, for example, by making the bore tube with different diameter sections to match the size of the mode in that section.

In an alternative arrangement, the inside diameters of the annular projections can individually be chosen to match the TEMoo mode diameter. To conform to the mode diameter in a $CO_2$ laser with a standard optical resonator, the inside diameters of the annular projections define a generally tapered bore diameter.

BRIEF DESCRIPTION OF THE DRAWINGS

FIG. 1 is a schematic diagram of a folded carbon dioxide laser.

FIG. 2 is a schematic representation of a folded $CO_2$ laser having stepped discharge-confining bore tubes in accordance with the present invention.

FIG. 3 is a cross-section view of the bore tubes of FIG. 2 in the direction indicated by the arrows.

FIG. 4 is a longitudinal sectional view of one of the individual discharge-confining bore tubes of the laser of FIGS. 2 and 3.

FIG. 5 is a detailed section view of a part of a discharge-confining bore tube showing an inwardly-extending annular projection, in accordance with the present invention.

FIG. 6 is a detailed sectional view of a bore tube illustrating an alternative annular projection in accordance with the present invention.

FIG. 7 is a sectional view of a gaseous laser in accordance with the present invention wherein the annular projections define a tubular configuration.

DESCRIPTION OF THE PREFERRED EMBODIMENTS

FIG. 1 is a schematic illustration of a folded carbon dioxide ($CO_2$) laser 10. While a folded laser may have any number of sections depending upon desired output power, the illustrated folded laser 10 has four sections 12, 14, 16 and 18. Sections 12 and 14 are joined together by a corner mirror assembly 20. Similarly, a corner mirror assembly 22 joins sections 14 and 16 and corner mirror assembly 24 joins sections 16 and 18. Each of the mirror assemblies 20, 22 and 24 form an airtight seal with the respective sections joined together. Additionally, a pair of mirrors 26 and 28 (FIG. 2) are provided within each of the mirror assemblies to provide a way of "bending" or reflecting the internally reflected laser beam through the respective sections.

The ends of the folded tube sections are capped with an optical resonator assembly comprising a high reflectivity mirror assembly 30 at the end of section 18 and an output coupler mirror assembly 32 at the end of section 12. The output coupler assembly mirror 32 permits the passage of a laser light beam 34.

Plasma tubes coxialy aligned within the tubes 12, 14, 16 and 18 contain the lasing medium. In the case of a $CO_2$ laser, as is well known, the lasing medium comprises a mixture of gases, namely, carbon dioxide, nitrogen, and helium. The gaseous medium is excited to the necessary elevated energy states for lasing to occur by means of a series of cathodes 36 at one end of each of the tube sections, a second series of cathodes 38 at the other end, and a series of anodes 40 near the middle of each section. An appropriate voltage is provided between the anode and cathodes by a power supply, not shown.

In accordance with the present invention, a high-power TEMoo mode $CO_2$ laser comprises a bore or plasma tube which, in one embodiment, comprises a plurality of tube sections. These tube sections are designed to include periodic reductions in diameter to break up and scatter light that would otherwise be reflected in large incidence angles and confined within the tubes. The diameters of the individual sections forming the plasma tube are then chosen to approximately match the size of the fundamental mode in that section. This is illustrate in greater detail in FIG. 2-4.

FIGS. 2 and 3 schematically show the four folded sections of the plasma or bore tube which form the folded laser 10 of FIG. 1. Each of the sections 12, 14, 16 and 18 defining the laser 10 include coaxially aligned plasma or bore tubes 42, 44, 46 and 48. Each tube is provided with spaced-apart annular projections 50 as shown in FIG. 4. These annular projections break up and scatter light that would otherwise be reflected at large incident angles and confined within the plasma tube.

The space between the outside surface of these bore tubes, and the outer walls of each of the sections 12, 14, 16 and 18 define a volume for the passage of a coolant to take away heat generated within the plasma tubes. The diameter of the sections 14 and 16, and the respective plasma tubes 44 and 46 are chosen to be substantially smaller than the diameters of the sections 12 and 18, and their respective plasma tubes 12 and 18. This is because the diameter of the TEMoo mode light beam reflected within folded laser 10 is smaller within the interior of laser 10 than at the ends nearest the optical resonator mirrors The reason for using smaller diameter discharge confining bore tubes within the interior of the laser 10 is explained as follows. For high-power lasers the length of the plasma tube is typically many meters long and the TEMoo mode is not large enough in the center of the cavity to fill the region filled by the plasma discharge. For example, in one actual embodiment, the mode diameter is about 8.4 millimeters in the center of the laser and 15.6 millimeter at the ends of the plasma tube section. A bore diameter of 30 millimeters, as dictated by the mode diameter at the tube ends, over the full length of this laser would mean that at the center of the laser the main part of the beam would occupy less than 10% of the excited volume. This would result in lower than expected output power and efficiency. With the waveguiding effect present in existing lasers this is not a problem as the multiple reflections and higher order modes insure that the entire active region is filled all along the plasma tube In the embodiment of FIGS. 2-4, the difference between the outside diameter 52 of each of the plasma confining bore tubes 42, 44, 46 and 48, less the inside diameter of 54 of each of the projections, is the same. In other words, the amount of inward protusion of each of the annular projections 50 is constant in each of the plasma bore tubes. What causes the bore tube to conform to the mode diameter is the relatively smaller diameter of the interior bore tubes 44 and 46 compared with the outer tubes 42 and 43. As an example, in one actual embodiment, the inside diameter of the plasma-confining bore tubes 42 and 48 is 30 millimeters and that of the plasma-confining bore tubes 44 and 46 is 22 millimeters.

Inclusion of the annular projections 50 makes the design of a high-power TEMoo-mode $CO_2$ laser much different and much less forgiving of any errors or neglect of optical effects in the plasma that would otherwise be unimportant with smoothbore tubes. The first step in the design is to determine the size of the TEMoo mode at the points in the cavity where it will be most tightly restricted. In the simplist case, the optical cavity consists of a concave mirror at each end of a single plasma tube. The mode size is therefore largest at the resonator mirrors and is most tightly restricted by the apertures formed by the ends of the tube. The size of the tube is the smallest diameter that these apertures can be without distorting the fundamental mode and causing a significant reduction in output power. The process by which this diameter is determined proceeds as follows:

1. Calculate the magnitude of the negative lens effect. Since this effect depends on the square of the tube diameter, some reasonable estimate of the final diameter must be made to get started. Assumptions must also be made about the gas mixture, gas pressure and the electrical power dissipated in the plasma.

2. Calculate the laser mode diameter (between $1/e$ squared intensity points) at the tube ends, including the effect of the negative lens in the calculation. Repeat this calculation for different end mirror radii of curvature to find the mirror radius that provides the smallest mode size at the tube ends.

3. Determine the diameter required for the plasma tube. It has been found that best results are obtained by making the tube 1.9 to 2.0 times larger than the mode diameter calculated in the above step. Use this diameter and repeat steps 1 and 2. After 2 or 3 iterations the process will converge and yield a final diameter for the plasma tube.

4. For multiple section tubes, have each section's diameter chosen to match the size of the mode in that section. Thus, steps 1–3 are repeated for each plasma tube section.

FIGS. 5 and 6 show details of the inwardly-extending, annular projections in a plasma tube 51. In FIG. 5, the annular projection is fabricated by crimping the glass walls of the plasma tube 51 to form an annular ripple. In FIG. 6, the same effect is achieved by providing a circular band or ring 53 within the inside diameter of the bore tube 51. This ring 53 can be made, for example, with a band of glass, a coil of wire, or a band of sheet metal.

FIG. 7 shows a single section carbon dioxide laser 56 having an output coupler mirror 5B and a high reflectivity mirror 60. As can be seen the laser beam 34 has a generally tapered or truncated shape as it is reflected between the reflectors 58 and 60. In accordance with another aspect of the present invention, the annular projections or ripples in the case of the plasma tube 62 have inside diameters which are selected to conform with the diameter of the mode of the laser as it changes within the tube. Thus, projection 64 has a smaller inside diameter than annular projection 62. In turn, annular projection 60 has an even larger inside diameter than projection 62. As can be seen from FIG. 7 the inside diameter of the ripples define a generally truncated or tapered configuration, conforming to the fundamental mode diameter.

What is claimed is:

1. A gas laser comprising:
    a discharge-confining bore tube enclosing a gaseous lasing medium;
    a pair of optical resonator mirrors aligned with said bore tube;
    means for exciting said gaseous medium; and
    means for dispersing unwanted reflected light and providing desired mode operation comprising periodic annular projections within the interior of said discharge-confining bore tube, said annular projections having inside diameters which vary in accordance with the desired mode, as the mode diameter changes along said bore-tube.

2. The gas laser of claim 1 wherein each of said projections has an inside diameter which matches the desired mode diameter at that point in said bore tube.

3. The gas laser of claim 2 wherein the inside diameter of said annular projections defines a tapered configuration.

4. The gas laser as in claim 1 wherein the variations of the inside diameters of said annular projections are provided by providing said discharge-confining bore tube with a plurality of sections having at least two different diameters.

5. A folded carbon dioxide laser comprising:
    a plurality of gas-confining bore tube sections enclosing a gas mixture including carbon dioxide, said sections being parallel to each other and including means for suppressing reflections therein;
    a plurality of corner mirror assemblies for connecting the bore tube sections into a continuous, gas-confining channel defining an optical path;
    an optical resonator comprising a high reflectivity mirror at one end of the gas-confining channel and an output coupler mirror at the other;
    means for exciting the gas mixture; and
    means for improving the TEMoo mode by matching the diameter of each bore tube section with the size of the mode in that section.

6. A folded carbon dioxide laser as in claim 5 wherein said suppressing means comprises inwardly directed annular projections.

7. A folded carbon dioxide laser as in claim 6 wherein said annular projections comprises crimps in said bore tube sections.

8. A folded carbon dioxide laser as in claim 6 wherein said annular projections comprise rings inserted within said bore tube sections.

9. A folded carbon dioxide laser comprising:
    a plurality of gas-confining bore tube sections enclosing a gas mixture including carbon dioxide and including a plurality of spaced-apart annular projections extending radially inward therefrom;
    a plurality of corner mirror assemblies for connecting the bore tube sections into a continuous, gas-confining channel defining an optical path;
    an optical resonator comprising a high reflectivity mirror at one end of the gas-confining channel and output mirror at the other, and
    wherein the diameters of said bore tube sections match the mode in that section.

10. A folded carbon dioxide laser as in claim 9 wherein said annular projections comprises crimps in said bore tube sections.

11. A gaseous laser comprising:
    a discharge-confining bore tube enclosing a gaseous medium;
    a pair of optical resonator mirrors aligned with said bore tube;
    means for exiting said gaseous medium; and
    means for providing a TEMoo mode laser output by providing a plurality of annular projections extending radially inward of said bore tube, wherein the inside diameter of said projections define a tapered configuration to match the TEMoo mode diameter within said bore tube.

* * * * *